(12) United States Patent
Eizenman et al.

(10) Patent No.: US 11,573,885 B1
(45) Date of Patent: Feb. 7, 2023

(54) SYSTEM AND METHOD FOR TEST SELECTION ACCORDING TO TEST IMPACT ANALYTICS

(71) Applicant: SeaLights Technologies LTD, Kfar-Saba (IL)

(72) Inventors: Alon Eizenman, Netanya (IL); Alon Weiss, Holon (IL); Ala Schneider, Modiin (IL); Nadav Yeheskel, Tel Aviv (IL); Amir Schwartz, Kokhav Ya'ir (IL); Eran Sher, Kfar Saba (IL)

(73) Assignee: SeaLights Technologies LTD, Kfar-Saba (IL)

( * ) Notice: Subject to any disclaimer, the term of this patent is extended or adjusted under 35 U.S.C. 154(b) by 148 days.

(21) Appl. No.: 17/024,740

(22) Filed: Sep. 18, 2020

Related U.S. Application Data

(60) Provisional application No. 62/906,215, filed on Sep. 26, 2019.

(51) Int. Cl.
*G06F 11/36* (2006.01)
*G06N 20/00* (2019.01)

(52) U.S. Cl.
CPC ...... *G06F 11/3676* (2013.01); *G06F 11/3688* (2013.01); *G06N 20/00* (2019.01)

(58) Field of Classification Search
CPC .......... G06F 11/3676; G06F 11/3688; G06N 20/00
See application file for complete search history.

(56) References Cited

U.S. PATENT DOCUMENTS

| | | | |
|---|---|---|---|
| 5,778,169 | A | 7/1998 | Reinhardt |
| 7,028,290 | B2 | 4/2006 | Srivastava |
| 7,178,131 | B2 | 2/2007 | Mitchell |
| 7,281,242 | B2 | 10/2007 | Inamdar |
| 7,530,060 | B1 | 5/2009 | Fontenot |
| 7,774,663 | B2 | 8/2010 | Kapur |
| 7,836,367 | B2 | 11/2010 | Kapur |
| 7,856,332 | B2 | 12/2010 | Karthikeyan |
| 7,868,780 | B2 | 1/2011 | Engel |

(Continued)

FOREIGN PATENT DOCUMENTS

| | | |
|---|---|---|
| CN | 102419728 A | 4/2012 |
| CN | 102722436 A | 10/2012 |

(Continued)

OTHER PUBLICATIONS

Matthias Hirzel et al. "Prioritizing Regression Tests for Desktop and Web-Applications based on the Execution Frequency of Modified Code", pp. 1-12, [Retrieved from Internet on Nov. 5, 202], <https://dl.acm.org/doi/pdf/10.1145/2972206.2972222> (Year: 2016).*

(Continued)

*Primary Examiner* — Ziaul A Chowdhury
(74) *Attorney, Agent, or Firm* — Graeser Associates International Inc; Dvorah Graeser

(57) ABSTRACT

A system and method for determining a relative importance of a selected test in a plurality of tests, comprising a computational device for receiving one or more characteristics relating to an importance of the code, an importance of each of the plurality of tests, or both; and for determining the relative importance of the selected test according to said characteristics.

31 Claims, 10 Drawing Sheets

(56) References Cited

U.S. PATENT DOCUMENTS

| | | | |
|---|---|---|---|
| 7,899,661 | B2 | 3/2011 | Van Rompaey |
| 7,900,105 | B2 | 3/2011 | Kapur |
| 7,962,905 | B2 | 6/2011 | Inamdar |
| 7,966,346 | B1 | 6/2011 | Jameson |
| 7,975,257 | B2 | 7/2011 | Fanning |
| 8,079,018 | B2 | 12/2011 | Huene |
| 8,205,191 | B1 | 6/2012 | Kolawa |
| 8,266,563 | B2 | 9/2012 | Plaza |
| 8,386,972 | B2 | 2/2013 | Hakewill |
| 8,468,503 | B2 | 6/2013 | Grosse |
| 8,473,907 | B1 | 6/2013 | Zandi |
| 8,516,434 | B2 | 8/2013 | McPeak |
| 8,521,499 | B1 | 8/2013 | Van Rompaey |
| 8,522,221 | B1 | 8/2013 | Braun |
| 8,543,367 | B1 | 9/2013 | Van Rompaey |
| 8,578,344 | B2 | 11/2013 | Godefroid |
| 8,739,135 | B2 | 5/2014 | Eigler |
| 8,762,918 | B2 | 6/2014 | Min |
| 8,832,640 | B1 | 9/2014 | Roche |
| 8,898,647 | B2 | 11/2014 | Sobolev |
| 8,938,729 | B2 | 1/2015 | Martin |
| 9,075,914 | B2 | 7/2015 | Huggins |
| 9,141,807 | B2 | 9/2015 | Chou |
| 9,170,847 | B2 | 10/2015 | Huggins |
| 9,389,986 | B2 | 7/2016 | Abraham |
| 9,559,928 | B1 | 1/2017 | Porter |
| 10,678,678 | B1 * | 6/2020 | Tsoukalas ........... G06F 11/3664 |
| 2003/0212988 | A1 | 11/2003 | Tsai |
| 2005/0166094 | A1 | 7/2005 | Blackwell |
| 2005/0229165 | A1 | 10/2005 | Ma |
| 2006/0179350 | A1 | 8/2006 | Nathan |
| 2006/0195724 | A1 | 8/2006 | Filho |
| 2007/0006041 | A1 | 1/2007 | Brunswig |
| 2007/0074175 | A1 | 3/2007 | Bengtsson |
| 2007/0103175 | A1 | 5/2007 | Eigler |
| 2008/0120602 | A1 | 5/2008 | Comstock |
| 2008/0141224 | A1 | 6/2008 | Kawasaki |
| 2009/0144698 | A1 | 6/2009 | Fanning |
| 2009/0249305 | A1 | 10/2009 | Li |
| 2009/0287729 | A1 | 11/2009 | Chen |
| 2009/0327680 | A1 | 12/2009 | Dale |
| 2010/0058295 | A1 | 3/2010 | Johnson |
| 2012/0011493 | A1 | 1/2012 | Singh |
| 2012/0084756 | A1 | 4/2012 | Subramanian |
| 2012/0167057 | A1 | 6/2012 | Schmich |
| 2012/0198421 | A1 | 8/2012 | Arumugham |
| 2012/0222014 | A1 | 8/2012 | Peretz |
| 2012/0233596 | A1 | 9/2012 | Adler |
| 2013/0125096 | A1 | 5/2013 | Kruetzfeldt |
| 2013/0346046 | A1 | 12/2013 | Van Rompaey |
| 2013/0346947 | A1 | 12/2013 | Braverman |
| 2014/0007090 | A1 | 1/2014 | Rugina |
| 2014/0047538 | A1 | 2/2014 | Scott |
| 2014/0059399 | A1 | 2/2014 | Kapur |
| 2014/0096113 | A1 | 4/2014 | Kuehlmann |
| 2014/0173564 | A1 | 6/2014 | Crawford |
| 2014/0189641 | A1 | 7/2014 | Anderson |
| 2014/0289697 | A1 | 9/2014 | Wenda |
| 2014/0331206 | A1 | 11/2014 | Abraham |
| 2014/0351793 | A1 | 11/2014 | Bartley |
| 2015/0007140 | A1 | 1/2015 | Boshernitsan |
| 2015/0026121 | A1 | 1/2015 | Shani |
| 2015/0052501 | A1 | 2/2015 | Shani |
| 2015/0095703 | A1 | 4/2015 | Girmonsky |
| 2015/0169431 | A1 | 6/2015 | Ivankovic |
| 2015/0381467 | A1 | 12/2015 | Girmonsky |
| 2016/0026559 | A1 | 1/2016 | Geheb |
| 2016/0246838 | A1 * | 8/2016 | Li ........................ G06F 11/3676 |
| 2016/0259714 | A1 | 9/2016 | Shor |
| 2016/0299759 | A1 | 10/2016 | Krajec |
| 2016/0378647 | A1 * | 12/2016 | Maeoka ............. G06F 11/3688 717/124 |
| 2017/0003948 | A1 | 1/2017 | Iyer |
| 2018/0365136 | A1 * | 12/2018 | Kumar ................ G06F 11/3684 |
| 2019/0236012 | A1 | 8/2019 | Gschwind |
| 2020/0084152 | A1 | 3/2020 | Zhang |
| 2020/0311611 | A1 * | 10/2020 | Kennedy .................. G06N 3/08 |
| 2021/0018887 | A1 | 1/2021 | Brown |
| 2021/0029170 | A1 | 1/2021 | Gupta |

FOREIGN PATENT DOCUMENTS

| | | |
|---|---|---|
| CN | 103631707 A | 3/2014 |
| CN | 103699476 A | 4/2014 |
| CN | 104598378 B | 5/2015 |
| CN | 105224460 A | 1/2016 |
| CN | 106326118 A | 1/2017 |
| KR | 100990777 B1 | 6/2008 |
| KR | 20150007806 A | 1/2015 |
| WO | 2013115797 A1 | 8/2013 |

OTHER PUBLICATIONS

Chao Chen et al., "Usage-pattern Based Statistical Web Testing and Reliability Measurement", pp. 140-147, [Retrieved from Interent on Nov. 5, 2022], <https://pdf.sciencedirectassets.com/280203/1-s2.0-S1877050913X00067/1-s2.0-S1877050913008132/main.pdf> (Year: 2013).*

Capturing malware propagations with code injections and code-reuse attacks, author: D Korczynski, et al, published on 2017; Source ACM SIGSAC, 18 pages.

Extended European Search Report for App No. EP17838916.9, dated Apr. 14, 2020, 12 pages.

Notice of Allowance dated Apr. 16, 2021 for U.S. Appl. No. 15/583,540 (pp. 1-10).

Notice of Allowance dated May 11, 2021 for U.S. Appl. No. 16/323,263 (pp. 1-7).

Office Action dated Feb. 11, 2021 for U.S. Appl. No. 16/323,263 (pp. 1-77).

Office Action dated Jul. 30, 2020 for U.S. Appl. No. 16/323,263 (pp. 1-60).

Office Action dated Nov. 3, 2020 for U.S. Appl. No. 16/583,540 (pp. 1-14).

The dynamic probe class library—an infrastructure for developing instrumentation for performance tools, author: L DeRose, published on 2001 Source: IEEE, 7 pages.

Valgrind: a framework for heavyweight dynamic binary instrumentation author: N Nethercore et al, published on 2007; source ACM Sigplan, 12 pages.

Office Action (Non-Final Rejection) dated Sep. 12, 2022 for U.S. Appl. No. 17/371,144 (pp. 1-22).

* cited by examiner

| | File #1 | File #2 | File ... | File #M |
|---|---|---|---|---|
| Exec #1 | + | - | ⋮ | + |
| Exec #2 | + | - | ⋮ | + |
| Exec ... | + | - | ⋮ | - |
| Exec #N | + | + | ⋮ | + |

Figure 2A

|  | File #1 | File #2 | File ... | File #M |
|---|---|---|---|---|
| Test #1 | + | - | ⋮ | + |
| Test #2 | + | + | ⋮ | + |
| Test ... | - | - | ⋮ | - |
| Test #N | - | + | ⋮ | - |

Figure 2B

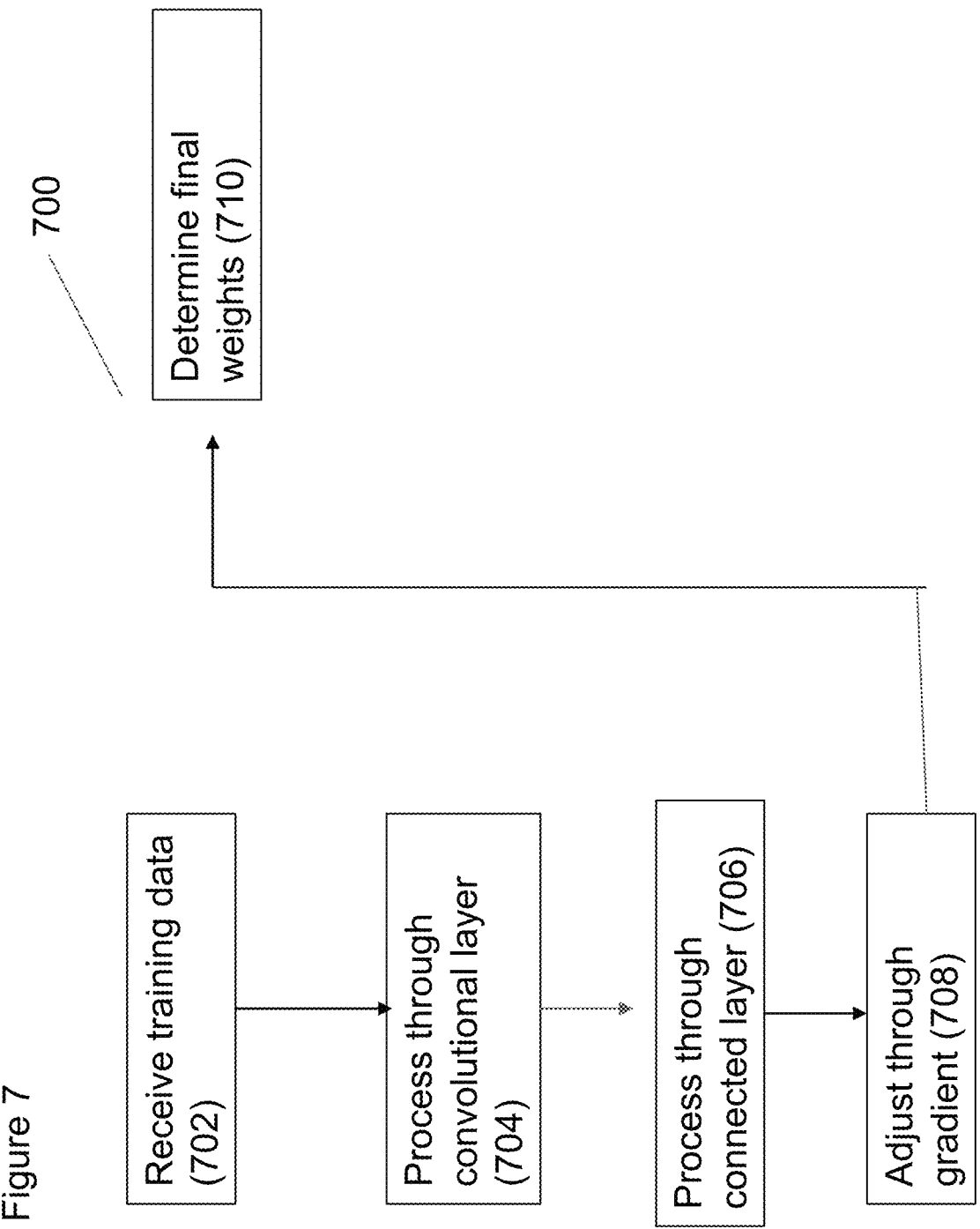

SYSTEM AND METHOD FOR TEST SELECTION ACCORDING TO TEST IMPACT ANALYTICS

FIELD OF THE INVENTION

The present invention is of a system and method for determining test selection according to test impact analytics and in particular, of such a system and method for applying test timing and history to determine test analytics for per test coverage.

BACKGROUND OF THE INVENTION

Various methods are known in the art for determining test impact analytics. Test impact analytics relates to the impact of a particular test on determining the behavior of code, and in particular, whether such code is executing in an expected manner according to the expected parameters and is therefore showing expected behavior.

Not all tests are necessary to determine whether code shows such expected behavior. For example, tests that only cover code that has not changed may not be necessary to run. However it may be difficult to determine which tests are relevant for which aspects of the code, and even more difficult to determine which tests are of relatively greater importance.

BRIEF SUMMARY OF THE INVENTION

The present invention overcomes the drawbacks of the background art by providing a system and method for selecting one or more tests according to test impact, for example as determined with regard to test history and/or test timing. By "test history" it is meant which tests were executed at which time, for example in order to determine which tests are relevant for coverage of particular code.

According to at least some embodiments, there is provided a system and method for statistically determining a relative importance of running a particular test within a plurality of such tests. The solution is based on mapping of a test method to a list of methods/functions which are executed upon execution of a test, or overall execution of a test itself. Preferably, once the relative importance of running a particular test has been determined, it is possible to determine whether a particular test should be run at a particular time, or indeed whether it should be run at all. The relative importance may be determined for example according to a characteristic of the code, a characteristic of the test, a characteristic of who or what caused the code to change, when the code was changed and the context of other changes to the code, or a combination thereof.

For example in relation to an importance of the code, characteristics include but are not limited to code usage in execution by the end user, interactions between a section of the code and other sections (with increased interactions relating to increased importance), an importance of the code overall for execution in production (that is, being "mission critical"), code with many changes or new commits, otherwise modified code, and so forth. Optionally such importance may be determined according to build scanning of the binary files and commit history as described herein, and/or other methods.

In relation to an importance of the test, characteristics include but are not limited to tests that apply to modified or added code, or code that is deemed important, tests that have failed previously, new and modified tests, and so forth. The relationship between a test and the code that is tested may be determined statistically, for example. As a non-limiting example, the statistical relationship may relate to a test execution time frame relative to execution time frame of a particular section of code.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Unless otherwise defined, all technical and scientific terms used herein have the same meaning as commonly understood by one of ordinary skill in the art to which this invention belongs. The materials, methods, and examples provided herein are illustrative only and not intended to be limiting.

An algorithm as described herein may refer to any series of functions, steps, one or more methods or one or more processes, for example for performing data analysis.

Implementation of the apparatuses, devices, methods and systems of the present disclosure involve performing or completing certain selected tasks or steps manually, automatically, or a combination thereof. Specifically, several selected steps can be implemented by hardware or by software on an operating system, of a firmware, and/or a combination thereof. For example, as hardware, selected steps of at least some embodiments of the disclosure can be implemented as a chip or circuit (e.g., ASIC). As software, selected steps of at least some embodiments of the disclosure can be implemented as a number of software instructions being executed by a computer (e.g., a processor of the computer) using an operating system. In any case, selected steps of methods of at least some embodiments of the disclosure can be described as being performed by a processor, such as a computing platform for executing a plurality of instructions.

Software (e.g., an application, computer instructions) which is configured to perform (or cause to be performed) certain functionality may also be referred to as a "module" for performing that functionality, and also may be referred to a "processor" for performing such functionality. Thus, processor, according to some embodiments, may be a hardware component, or, according to some embodiments, a software component.

Further to this end, in some embodiments: a processor may also be referred to as a module; in some embodiments, a processor may comprise one or more modules; in some embodiments, a module may comprise computer instructions—which can be a set of instructions, an application, software—which are operable on a computational device (e.g., a processor) to cause the computational device to conduct and/or achieve one or more specific functionality. Some embodiments are described with regard to a "computer," a "computer network," and/or a "computer operational on a computer network." It is noted that any device featuring a processor (which may be referred to as "data processor"; "pre-processor" may also be referred to as "processor") and the ability to execute one or more instructions may be described as a computer, a computational device, and a processor (e.g., see above), including but not limited to a personal computer (PC), a server, a cellular telephone, an IP telephone, a smart phone, a PDA (personal digital assistant), a thin client, a mobile communication device, a smart watch, head mounted display or other wearable that is able to communicate externally, a virtual or cloud based processor, a pager, and/or a similar device. Two or more of such devices in communication with each other may be a "computer network."

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the drawings:

FIG. 2A shows a non-limiting, exemplary build history map, showing the mapping between execution of tests and their footprint in a file or per method;

FIG. 2B shows a non-limiting exemplary statistical model, again operating per file or per method;

FIG. 7 shows a non-limiting, exemplary method for training a machine learning model.

DESCRIPTION OF AT LEAST SOME EMBODIMENTS

Figure 1:
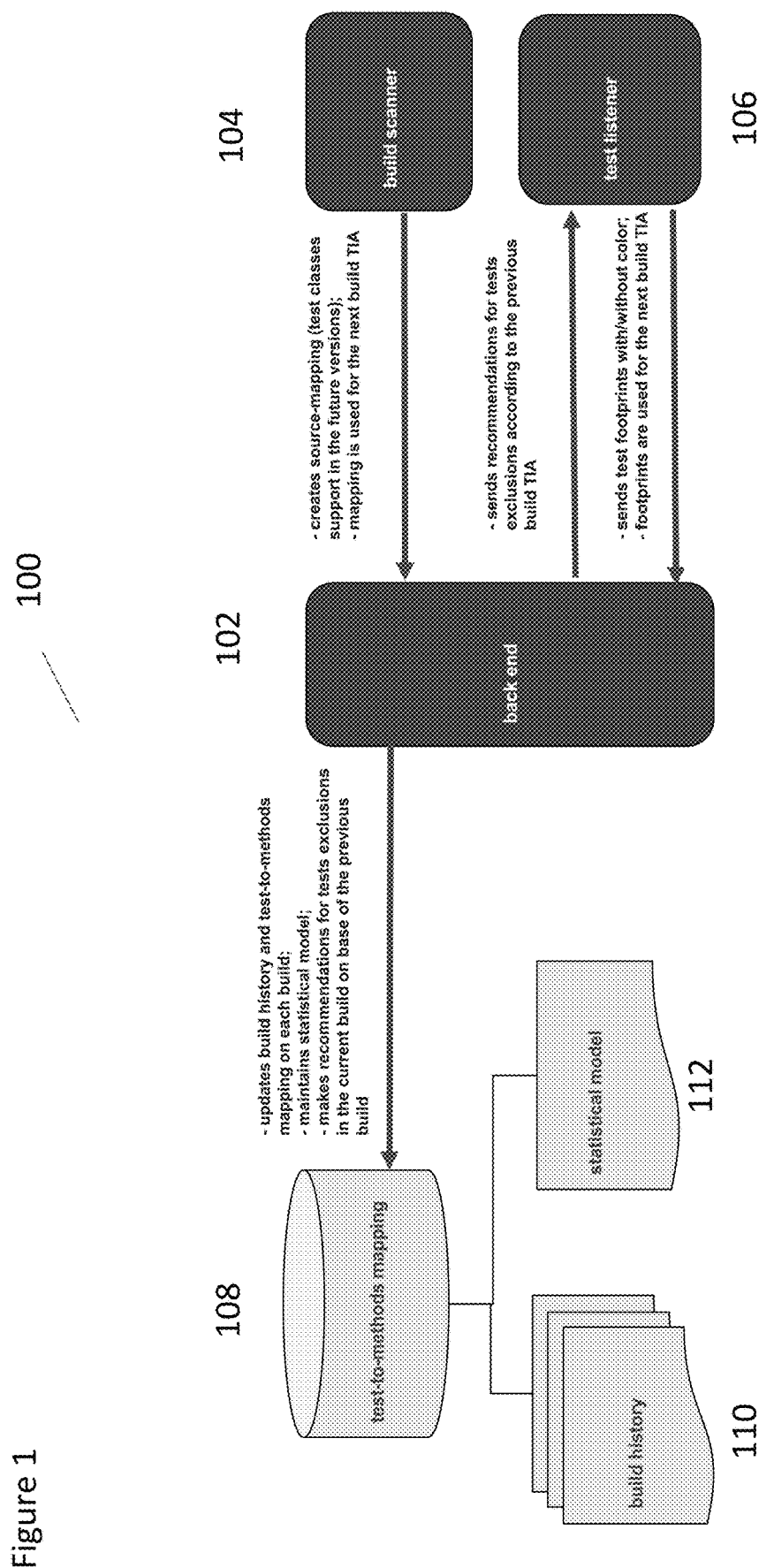
FIG. 1 relates to a non-limiting, exemplary system for statistically determining a relative importance of running a particular test.

Test impact analytics are an important aspect of testing code. Simply running all available tests may take a great deal of time and slow down development. On the other hand, failing to run an important test may cause code to be inadequately tested, and even lead to failures in production or execution.

New defects in the system are mainly created by code changes. Therefore, it is preferable that areas of code that were modified since the last text execution are tested. The tests that are run on code that was recently modified have a much higher probability of failure.

On the other hand, tests that have been previously run on code that was not modified should not suddenly start failing. If such a test is failing without a reason, it may be defective and so this test result would not be trusted.

However if a test fails, it is most probable that the reason for the failure is due to the code change that was done prior to the occurrence of the failure.

Given the above, when a full regression cycle for every given code change is performed, many tests may be run that have a very low probability of failure. As noted above, this may cause the delivery pipeline to be very slow and the feedback for the developers may be very long. In addition, the infrastructure cost of running a full regression is very high, the waiting queue for a test environment may then expand to a catastrophic level. In such a situation, sometimes test jobs need to be canceled urgently in order to push some important fixes or changes earlier. However, making such changes without prior analysis will not lead to the most efficient outcome—such as canceling only unnecessary tests.

Some manual test operations are built on the practice of having a test architect select the required tests to execute for a given build in order to optimize the test execution time. This selection is based on the knowledge of what the tests are doing and what the code change is, and how the code change may impact specific tests. Through such knowledge, the tests that are selected are hopefully the ones with a higher probability to fail. However, this is a manual selection done based on an individual's knowledge and subject to human mistakes. Such a manual selection inherently lacks visibility of how the changes are actually impacting the tests.

Preferably, instead of relying on fallible human selection, automatic and scientific methods are performed for test impact analytics and for selecting important code to test. Various methods may be used for the determination of code importance and/or test impact analytics. These test impact analytics consider the impact of the code change on tests and/or of the test on the code, in order to build a list of tests to be performed. Optionally the list is built according to an order of relative test importance, which may in turn be determined according to an importance of the test, an importance of the code to be tested or a combination thereof. For example, tests may be preferentially implemented on code that the end user is actively using, or causing to execute.

A user may also implement a manual rule or condition for running one or more tests. Additionally or alternatively, a user may also determine a degree of sensitivity vs accuracy. For example, the user may prefer that analysis of a relationship between code components and tests tends to favor running a test rather than not running the test. On the other hand, the user may prefer to only run tests that are clearly related to, or associated with, particular code.

Turning now to the Figures, FIG. 1 relates to a non-limiting exemplary system for statistically determining a relative importance of running a particular test. The solution is based on mapping of a test method to a list of methods in source files or generated artifacts by a build system (JAR, WAR, .NET assemblies, transpiled javascript code, etc) which are executed during the test method run, or execution of a test. Preferably, once the relative importance of running a particular test has been determined, it is possible to determine whether a particular test should be run at a particular time, or indeed whether it should be run at all.

In a system 100, the list of tests to run or exclusion of such tests is determined by a backend 102 by analyzing code changes and the status of various tests in the previous run (failed tests or new/modified tests). Backend 102 may for example correspond to the previously described cloud system. Backend 102 determines the effect of such code changes. Backend 102 receives the status of the tests being run, as well as the results from previously run tests, for example from an agent or other software monitoring the underlying test framework. Preferably backend 102 then applies statistical analysis to determine which tests are to be run, and more preferably to determine a relative importance of running one or more tests. For example and without limitation, backend 102 may determine that certain tests are required according to one or more test criteria, while other tests are less important in relation to the required tests. Optionally, input may be obtained from an end user or from another source, such as a software source for parameters for example, to determine which tests are more relevant and/or which tests are required.

Code changes are preferably collected by backend 102 after being reported by a build scanner 104. Build Scanner 104 preferably scans tests classes in the build map or artefact folder to allow management of test changes. Build scanner 104 preferably monitors changes in the build, and in particular changes in the code, which may be used to determine which tests are relevant by backend 102. Build scanner 104 may optionally cause or define the build, but preferably listens to a build server that actually causes the build to be constructed (not shown). Upon detecting that a new build has been made, or upon being notified of such a new build being made, build scanner 104 preferably then determines any differences from a previous build, optionally and preferably ignoring any extraneous information, such as comments on the code. Alternatively, build scanner 104 only receives the differences in the code from a previous build. Also optionally and alternatively, build scanner 104 determines such differences in the code from a previous build.

A test listener 106 may for example operate according to the previously described test agent. Preferably test listener 106 is able to modify test methods and to determine which should be excluded. Test listener 106 also preferably defines a new footprint format. Optionally, the context for this footprint, for example in terms of which tests are applied, the headers for communication for the tests, and so forth is also sent. Such context is preferably sent for uni-test implementations, optionally in place of timing or time based information. Alternatively, the test context is not sent.

Optionally and preferably test listener 106 collects code coverage from the application being tested while tests are running; collects test information and test results; and forces the test framework to run the recommended test list and skip the other tests not in the list (the recommendation process is described in greater detail below).

Back end 102 is optionally able to determine coverage by already applied test methods in relation to the previous build of the code. Optionally, back end 102 is able to predict code coverage of available tests on the new test build. Optionally and preferably back end 102 determines test coverage according to the test results or may receive such test coverage from a test agent as described in greater detail below. Optionally, test coverage is determined according to one or more of detection of at least one change in the code from a previous build to a current build and analysis of at least one test to determine whether such change has been tested; assessment of at least one previously failed test; assessment of at least one test coverage hole; or a combination thereof.

As previously noted, a test coverage hole may optionally be determined in the case that at least a portion of the code has not adequately been tested by test(s) that have been run, which may optionally include but is not limited to zero test coverage, in which no test that has been run tests that portion of the code.

In some cases (for example, when using test frameworks for tests running) the test listener 106 collects footprints in a test execution time frame and packs together test identifier and collected footprints—so-called colored footprints. In this case optionally back end 102 does not perform any additional mechanism for associating between test and tested code.

For example, in order to determine test coverage, optionally and preferably the number of methods tested is divided by the total number of methods in each component(s) to determine the percent coverage. Preferably also code branches and code lines are also considered in the calculation for the percent coverage. This determination is optionally and preferably made per environment and also across all environments.

The test cycle of a build may also optionally be divided into test environment and coverage may optionally be calculated as described above both per test environment and also across the entire build. Additionally and/or alternatively, unit-test results may also optionally be considered, unit-test results only provide coverage results across an entire build. The results of these tests may optionally show 100% coverage for each individual method within the build, as the tests may provide coverage such that each method is tested once, even if not all of the other test environments have 100% coverage.

It is also possible to skip a test, which may then optionally be noted separately, to show how many tests were skipped in general in terms of the coverage, and/or in comparison to what was checked in the previous build.

If tests are executed in stages, then optionally the determination is made for each test stage, for example to select one or more tests to be performed at each stage.

Backend 102 preferably associates footprints to a particular test according to time of footprints collection for a preferable time based solution. Optionally, backend 102 reviews tests that were performed, the code that was executed or reviewed at the time of performing the tests, and then compares such information. Preferably a statistical analysis is used to determine the likelihood of a particular test being associated with particular code.

Backend 102 preferably then generates a test to method mapping 108, by updating the build history on each build (shown as a build history 110) and by updating a statistical model 112 through a timer. Wherever the term "test to method mapping" is described, optionally a test may be mapped to a file or to another code component. Each of these two different types of mapping is explained in greater detail below.

Build History Mapping 110 is a matrix for each test, which contains affected files and methods for particular execution identifier. Up to N executions may be supported for each test. This mapping is created based on test execution data (footprints, etc.). Optionally, the above build map information may be fed to a machine learning model, to further analyze and refine test mapping to particular parts of code according to the build history. Also optionally, the above build map is fed to a statistical model to determine a further statistical map. FIG. 2A shows a non-limiting, exemplary build history map, showing that for each test, the map determines which files or methods have been covered per execution. This example refers to a scenario with 3 tests, N executions and M files, which may optionally be a method or any other suitable code component. FIG. 2A shows a mapping between an execution of tests to a file or a method in a file, or to any other suitable code component. Each row indicates that a file/method has been executed in the current execution.

A Statistical Model map 112 is a matrix of all known tested and test affected files (or methods). This mapping is calculated on the basis of historical mapping. FIG. 2B shows a non-limiting exemplary statistical model, showing that for each file or method, which tests should run is determined. This example refers to a scenario with N tests and M files (or methods). Again, instead of a file, optionally a method or any other suitable code component may be used.

Figure 3A:
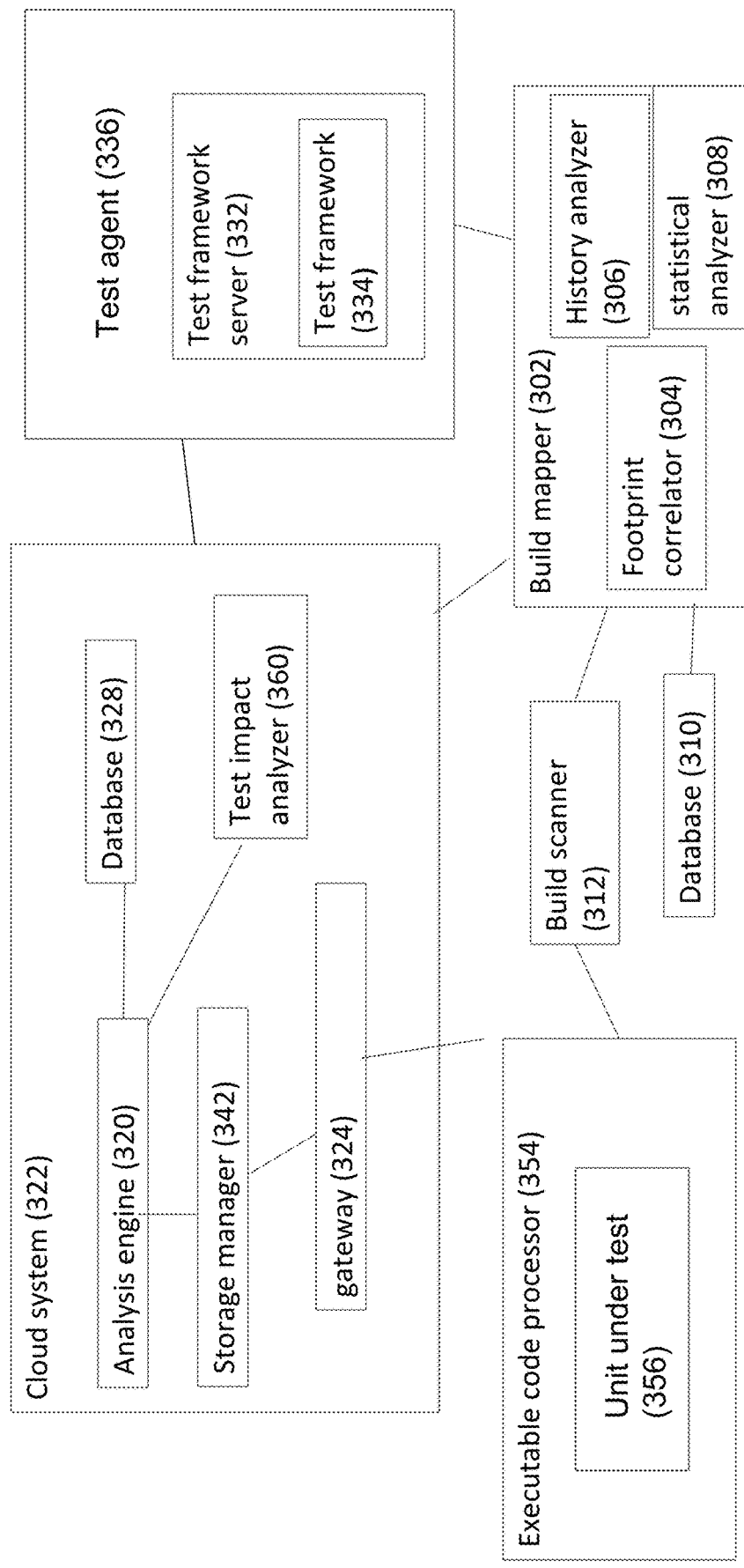
FIG. 3A shows a non-limiting, exemplary system for analyzing builds to determine which tests are relevant.

FIG. 3A shows a non-limiting, exemplary system for analyzing builds to determine which tests are relevant.

In the system 300, executable code processor 354 is executing a test 356. The test agent 336 monitors the behavior of unit under test 356 and causes one or more tests to be performed. These tests may perform through a test engine server 332 and a test framework 334. Test framework 334 preferably determines the code coverage for new, modified, or existing code and may also receive information from cloud system 322 regarding previous tests. Test framework 334 may then calculate the effect of a new test as to whether or not it will increase code coverage or whether it will not increase test code coverage, and in particular test coverage for specific code.

Test information is sent first to a storage manager 342 and then to analysis engine 320. Analysis engine 320 determines whether or not test code coverage should be updated, how it should be updated, whether any code has not been tested, and so forth. This information is stored in database 328 and is also passed back to gateway 324.

As shown, the test listener functions of FIG. 1 may be performed by test agent 336, alone or in combination with analysis engine 320.

A build mapper 302 preferably determines the relevance of one or more tests, according to whether the code that is likely covered by such tests has changed. Such a determination of likely coverage and code change in turn may be used to determine which tests are relevant, and/or the relative relevance of a plurality of tests.

Build mapper 302 preferably receives information about a new build and/or changes in a build from a build scanner 312. Alternatively, such functions may be performed by analysis engine 320. Build mapper then preferably receives information about test coverage, when certain tests were performed and when different portions of code were being executed when such tests were performed, from test agent 336 and/or analysis engine 320.

Build mapper 302 preferably comprises a footprint correlator 304, for determining which tests relate to code that has changed, or that is likely to have changed, as well as for receiving information regarding code coverage. Footprint correlator 304 in turn preferably communicates such information to a history analyzer 306 and a statistical analyzer 308. History analyzer 306 preferably assigns likely relevance of tests to the new or changed code, based on historical information. Such likely relevance is then based to statistical analyzer 308. Statistical analyzer 308 preferably determines statistical relevance of one or more tests to one or more sections of code, preferably new or changed code. For example, such statistical relevance may be determined according to the timing of execution of certain tests in relation to the code that was being executed at the time.

Other relevance measures may also optionally be applied. Information regarding the results of the build history map and/or statistical model are preferably stored in a database 310.

For determining the relative or absolute impact of a test, and optionally for selecting one or more preferred tests, a test impact analyzer 360 is shown as part of cloud system 322. Test impact analyzer 360 may have part or all of its functions incorporated in build mapper 302 or at another location (not shown). Test impact analyzer 360 is preferably able to recommend one or more tests to be performed, for example according to a policy set by the user, according to one or more rules or a combination thereof. Tests may be given a preference, relative or absolute, according to such a policy or such rules.

Non-limiting examples of such rules include a preference for impacted tests, previously used at least once, that cover a footprint in a method that changed in a given build. Also preferably recently failed tests may be performed again. New tests that were added recently or modified tests may be performed again. Tests that were recommended in the past but were not executed since then may have a preference to be performed.

Tests that are covering code that is being used in production may be preferred, particularly in case of inclusion of one of the above rules. Other code related rules may include but are not limited to tests that are covering code that was modified multiple times recently, and/or tests that are covering code that is marked manually or automatically as high risk code.

A non-limiting example of a user determined policy rule is the inclusion of an important test recommended by the user so that it is always executed in each selective run of the tests.

When a user selects the option of running only the recommended tests, it is done by defining a selective run policy that may include information about the occasions when to run the selective tests list or full test list, that can be based on number or tests executions in a day/week/month, or every number of test executions, or between a certain time frame.

Test impact analyzer 360 preferably performs test impact analytics, based on the above. Test Impact Analytics is based on the correlation between a test coverage and code changes. It may for example include giving a preference to the tests that have footprints in methods that were modified in a given build. Test impact analyzer 360 is supported by calculations of the code coverage for each test that was executed in any given test environment. The per test coverage is calculated based on a statistical correlation between a given time frame of the tests that were executed with the coverage information being collected during this time frame, as described above and in greater detail below.

Also as described in greater detail below, a machine learning system is preferably used to refine the aforementioned correlation of tests to coverage data. Such a system is preferably applied, due to the fact that test execution is not deterministic by nature and the fact that tests may run in parallel, which may render the results even more non-deterministic.

Optionally, test impact analyzer 360 determines that a full list of tests is to be run, for example but without limitation under the following conditions: 1. User selection of full run. 2. When server bootstrapping code has been modified. 3. Configuration or environment variables have been modified.

Figure 3B:
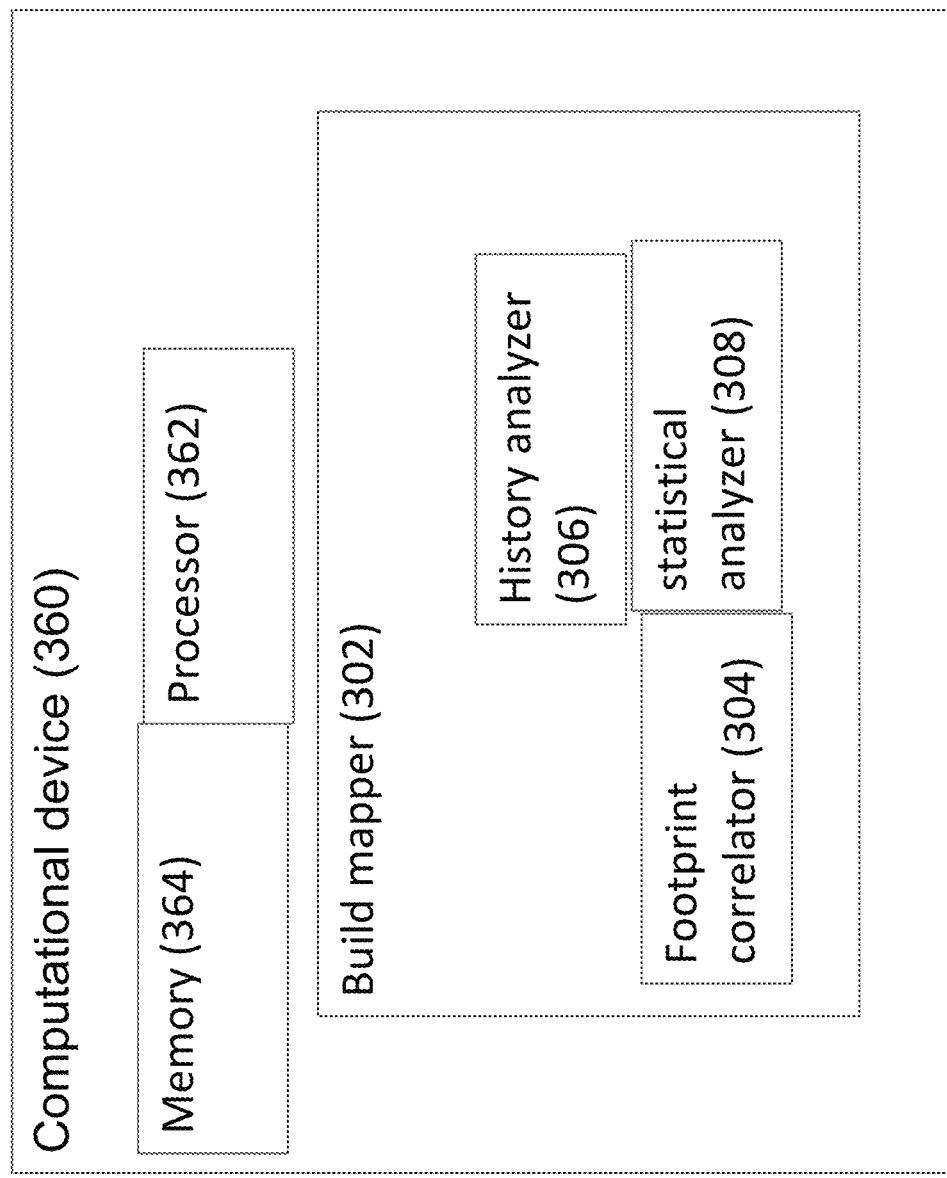
FIG. 3B shows a non-limiting, detailed example of a build mapper.

FIG. 3B shows a non-limiting, detailed example of a build mapper, as operated by an exemplary computational device.

Optionally any of the software modules of FIG. 3A may be operated by the same or a different computational device, also featuring such a processor and memory. As shown, a computational device 360 features a processor 362 and a memory 364, for operating build mapper 302 as previously described.

Functions of processor 362 preferably relate to those performed by any suitable computational processor, which generally refers to a device or combination of devices having circuitry used for implementing the communication and/or logic functions of a particular system. For example, a processor may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processor may further include functionality to operate one or more software programs based on computer-executable program code thereof, which may be stored in a memory, such as a memory 364 in this non-limiting example. As the phrase is used herein, the processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Also optionally, memory 364 is configured for storing a defined native instruction set of codes. Processor 362 is configured to perform a defined set of basic operations in response to receiving a corresponding basic instruction selected from the defined native instruction set of codes stored in memory 364. For example and without limitation, memory 364 may store a first set of machine codes selected from the native instruction set for receiving information from build scanner 312 (not shown) about a new build and/or changes in a build; a second set of machine codes selected from the native instruction set for receiving information about test coverage, when certain tests were performed and when different portions of code were being executed when such tests were performed, from test agent 336 and/or analysis engine 320 (not shown); and a third set of machine codes from the native instruction set for operating footprint correlator 304, for determining which tests relate to code that has changed, or that is likely to have changed, as well as for receiving information regarding code coverage.

Memory 364 may store a fourth set of machine codes from the native instruction set for communicating such changed code and/or code coverage information to a history analyzer 306, and a fifth set of machine codes from the native instruction set for assigning likely relevance of tests to the new or changed code, based on historical information. Memory 364 may store a sixth set of machine codes from the native instruction set for communicating such changed code and/or code coverage information to a statistical analyzer 308, and a seventh set of machine codes from the native instruction set for determining statistical relevance of one or more tests to one or more sections of code, preferably new or changed code.

Figure 4:
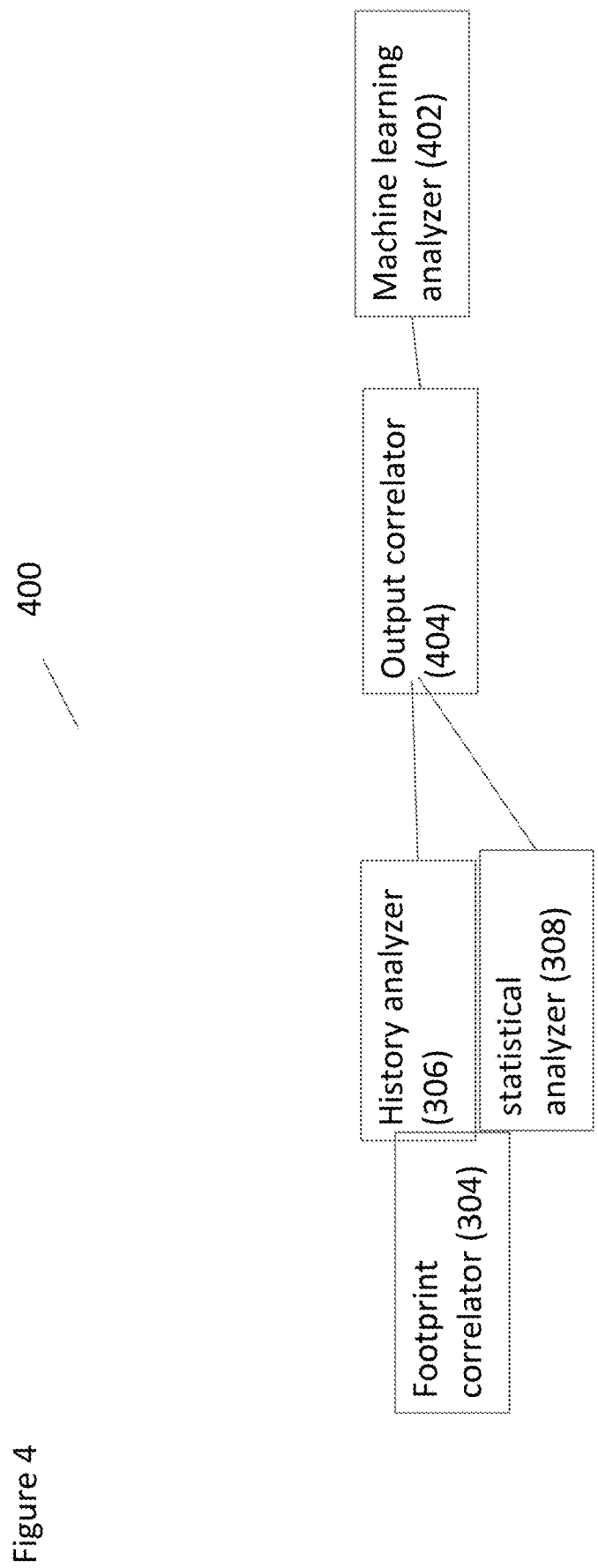
FIG. 4 shows an additional non-limiting, exemplary build mapper.

FIG. 4 shows a non-limiting, exemplary build mapper, in an implementation which may be used with any of FIGS. 1-3 as described above, or any other system as described herein. The implementation may be operated by a computational device as described with regard to FIG. 3B. Components with the same numbers as in FIG. 3 have the same or similar function. A build mapper 400 features a machine learning analyzer 402, which preferably receives information from history analyzer 306 and statistical analyzer 308. Machine learning analyzer 402 then preferably applies a machine learning model, non-limiting examples of which are given in FIGS. 5A and 5B, to determine the relative importance of a plurality of tests to particular code, files or methods.

More preferably, an output correlator 404 receives information from history analyzer 306 and statistical analyzer 308, and transmits this information to machine learning analyzer 402. Such transmission may enable the information to be rendered in the correct format for machine learning analyzer 402. Optionally, if history analyzer 306 and statistical analyzer 308 are also implemented according to machine learning, or other adjustable algorithms, then feedback from machine learning analyzer 402 may be used to adjust the performance of one or both of these components.

Once a test stage finishes executing, optionally with a "grace" period for all agents to submit data (and the API gateway to receive it), then preferably the following data is available to machine learning analyzer 402: a build map, a test list, and time slices. A Build map relates to the code of the build and how it has changed. For example, this may be implemented as a set of unique IDs+code element IDs which are persistent across builds. The test list is a list of all tests and their start/end timing. Time slices preferably include high-time-resolution slicing of low-coverage-resolution data (e.g. file-level hits [or method hits] in 1-second intervals).

The first step is to process the data to correlate the footprint per test (or a plurality of tests when tests are run in parallel). The second step is model update for the machine learning algorithm. Based on the build history, the latest available model for a previous build is loaded (ideally this should be the previous build).

If no such model exists, it is possible to assume an empty model with no data, or an otherwise untrained machine learning algorithm. The model consists of a set of test+code element id mapping (which are the key) and a floating point number that indicates the correlation between the test and the code element id. Such correlation information is preferably determined by statistical analyzer 308. For example, a "1.0" means the highest correlation, whereas a 0 means no correlation at all (the actual numbers will probably be in between).

For any test+code element id, the method preferably updates each map element, such as each row, according to the results received. For example, updating may be performed according to the following formula: NewCorrelation [test i,code element id j]=OldCorrelation[test i,code element id j]*0.9+(0.1 if there is a hit, 0 otherwise). This type of updating is an example of a heuristic which may be implemented in addition to, or in place of, a machine learning algorithm. Preferably these coefficients always sum up to 1.0, so there is effectively a single coefficient that relates to the speed (number of builds). For example, it is possible to do a new statistical model after each set of tests run, optionally per build.

Next preferably a cleanup step is performed where old correlations are deleted for code elements that no longer exist in the new build. Optionally a further cleanup step is performed where old tests are deleted, and methods that are very uncorrelated with tests (e.g. <0.1).

Optionally tests are selected for implementation according to a variety of criteria, once the statistically likely relationship between a particular test that is executed and the related code has been established. Such criteria may be determined according to test impact analytics. These test impact analytics consider the impact of the code and/or of the test on the code, in order to build a list of tests to be performed. Optionally the list is built according to the above described order of relative importance. The list may also comprise a plurality of lists, in which each list may contain a preferred order of tests. Such lists may be assigned for performance in a particular order and/or according to a particular time schedule. For example and without limitation, one list of a plurality of tests may be executed immediately, while another such list may be executed at a later time, which may for example and without limitation be a particular time of day or day of the week.

Another consideration for the creation of one or more lists is the implementation of a minimal set of tests as opposed to a full test review. For example, a list may contain a minimal necessary set of tests. Alternatively or additionally, at least one list may comprise a full set of tests only on code that the end user is actively using, or causing to execute. Such a list may be preferentially implemented, while a full set of tests on code that the user is not actively using may not be preferentially implemented, may be implemented with a delay or when resources are free, or may not be implemented at all.

The test impact analytics may include such criteria as preferred implementation of new and modified tests; tests selected by the user, failed tests, and/or tests that are selected according to code that actual end users cause to execute when the code is in production. Other important criteria for the code that may influence test selection include highly important code sections or code that is considered to be mission critical, as well as code that has required significant numbers of tests according to past or current criteria, with many interactions with other sections of code and/or with many new commits in the code.

Figure 5A:
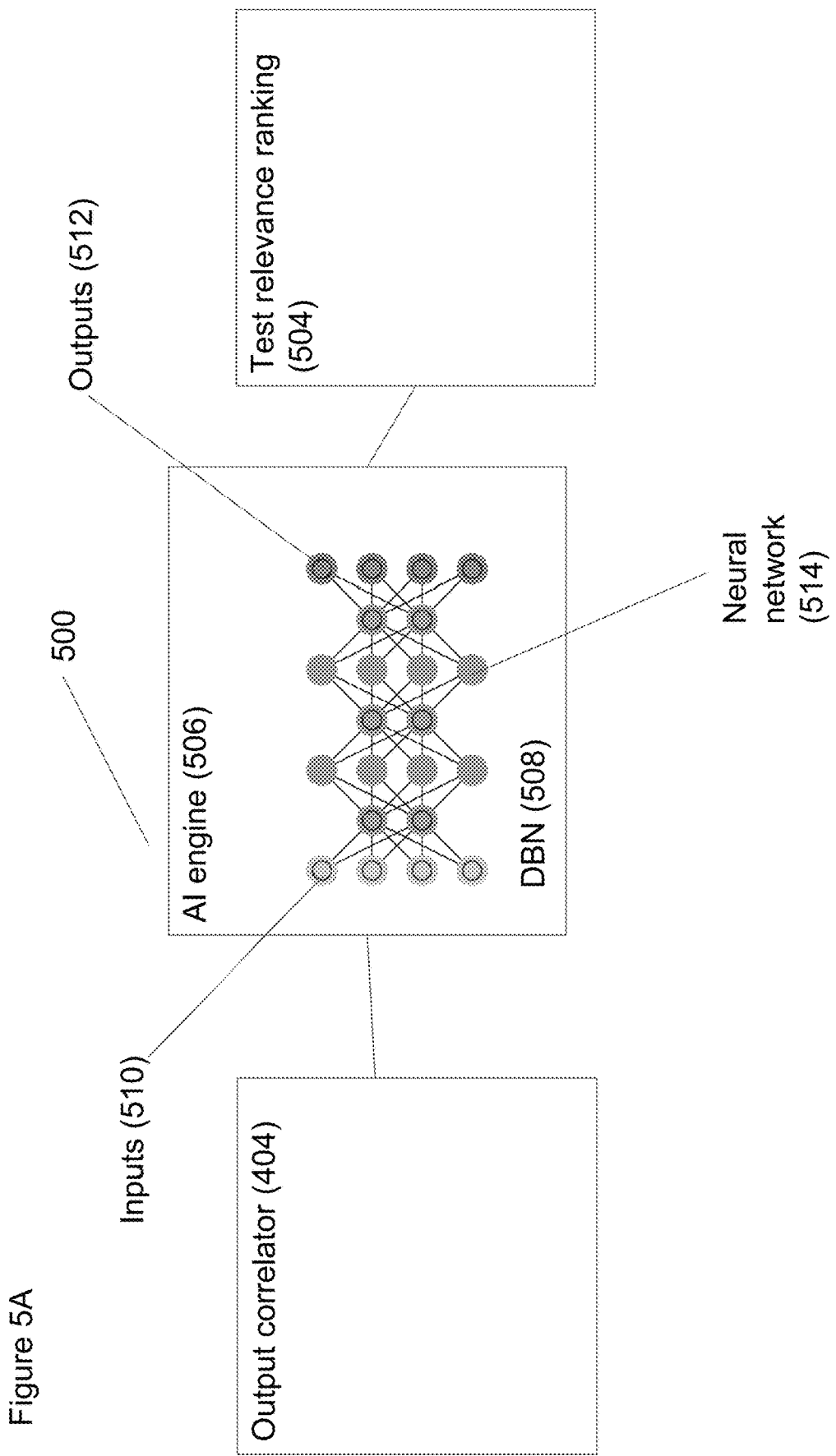
FIGS. 5A and 5B relate to non-limiting exemplary systems and flows for providing information to an artificial intelligence system with specific models employed and then analyzing it.
Figure 5B:
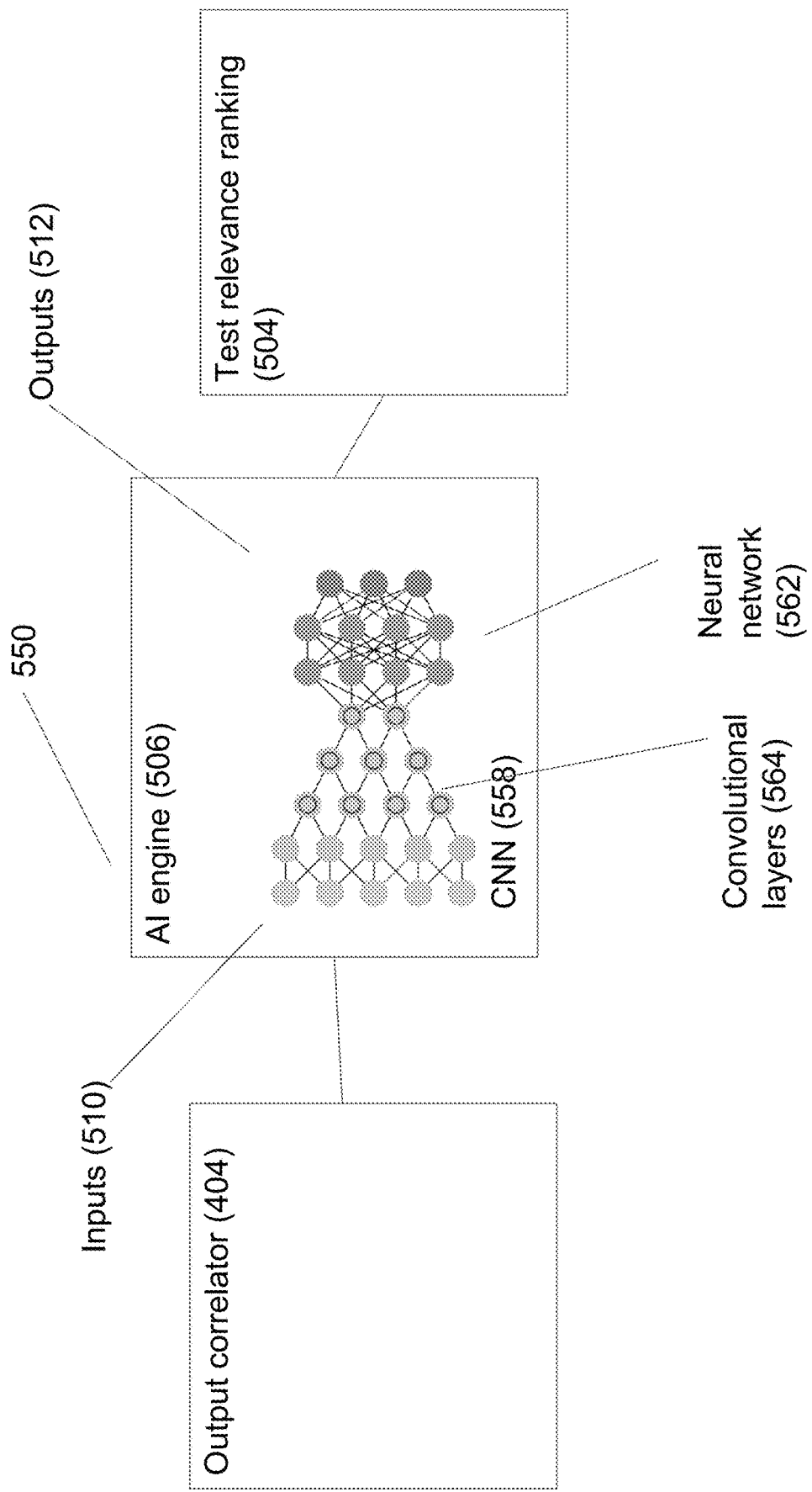

FIGS. 5A and 5B relate to non-limiting exemplary systems and flows for providing information to an artificial intelligence system with specific models employed and then analyzing it.

Turning now to FIG. 5A as shown in a system 500, information from the output correlation 404 of FIG. 4 is preferably provided at 502. This information is then fed into an AI engine in 506 and a test relevance ranking is provided by the AI engine in 504. In this non-limiting example, AI engine 506 comprises a DBN (deep belief network) 508. DBN 508 features input neurons 510 and neural network 514 and then outputs 512.

A DBN is a type of neural network composed of multiple layers of latent variables ("hidden units"), with connections between the layers but not between units within each layer.

FIG. 5B relates to a non-limiting exemplary system 550 with similar or the same components as FIG. 5A, except for the neural network model. In this case, a neural network 562 includes convolutional layers 564, neural network 562, and outputs 512. This particular model is embodied in a CNN (convolutional neural network) 558, which is a different model than that shown in FIG. 5A.

A CNN is a type of neural network that features additional separate convolutional layers for feature extraction, in addition to the neural network layers for classification/identification. Overall, the layers are organized in 3 dimensions: width, height and depth. Further, the neurons in one layer do not connect to all the neurons in the next layer but only to a small region of it. Lastly, the final output will be reduced to a single vector of probability scores, organized along the depth dimension. It is often used for audio and image data analysis, but has recently been also used for natural language processing (NLP; see for example Yin et al, Comparative Study of CNN and RNN for Natural Language Processing, arXiv:1702.01923v1 [cs.CL] 7 Feb. 2017).

Figure 6:
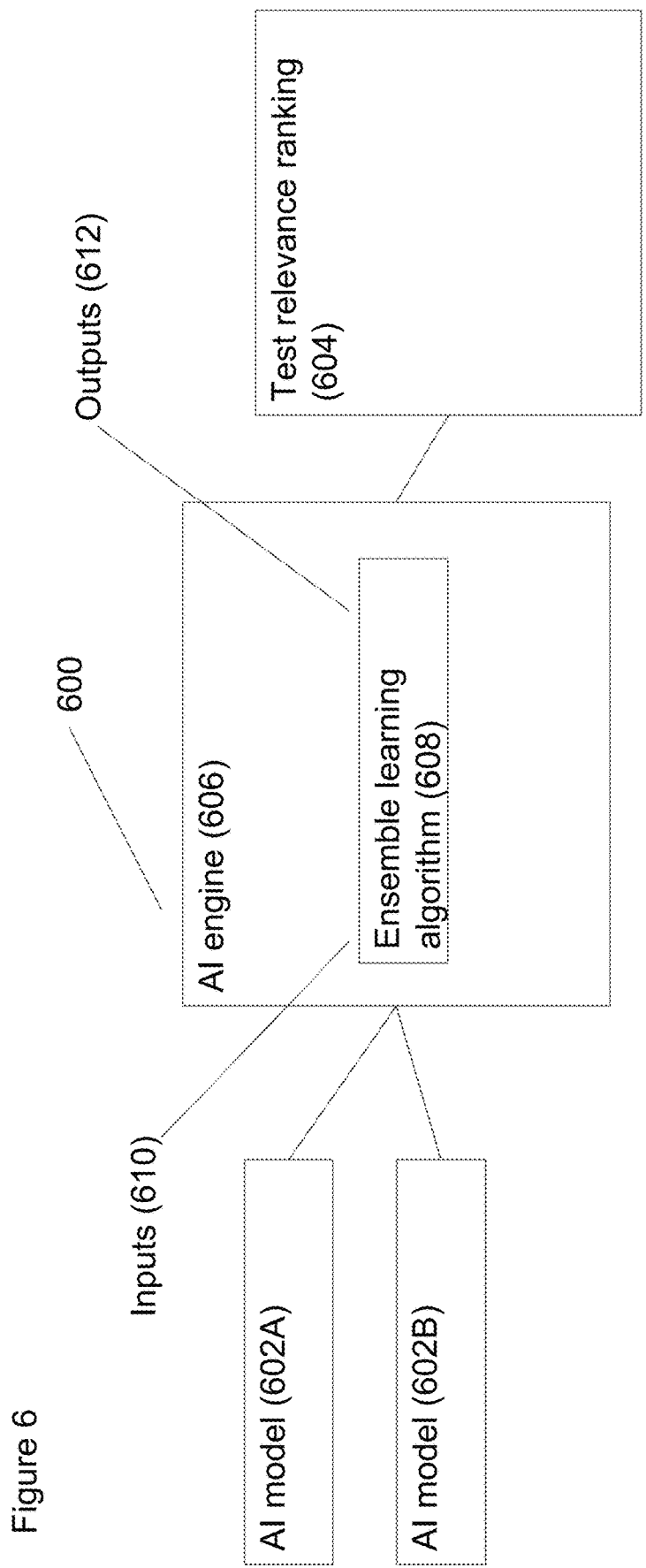
FIG. 6 shows a non-limiting, exemplary system and flow for ensemble learning.

FIG. 6 shows a non-limiting, exemplary system and flow for ensemble learning. Such a system features a combination of different models of which two non-limiting examples are shown. In this non-limiting example, in the system 600 a plurality of AI inputs 610 are provided from a plurality of AI models 602, shown as AI models 602A and 602B. Such models may be any suitable models as described herein. The outputs of these AI models are then provided to AI engine 606, operating an ensemble learning algorithm 608. Ensemble learning algorithm 608 may feature any type of suitable ensemble learning method, including but not limited to, a Bayesian method, Bayesian optimization, a voting method, and the like. Additionally and alternatively, ensemble learning algorithm 608 may feature one or more additional neural net models, such as for example, without limitation a CNN or an encoder decoder model. Transform models in general may also be used as part of ensemble learning algorithm 608.

Outputs 612 from AI engine 606 may then be provided as test relevance ranking 604, as previously described.

FIG. 7 shows a non-limiting, exemplary method for training a machine learning model. As shown in a flow 700, the training data is received in 702 and it is processed through the convolutional layer of the network in 704. This is if a convolutional neural net is used, which is the assumption for this non-limiting example, as shown for example with regard to FIG. 5B. After that the data is processed through the connected layer in 706 and adjusted according to a gradient in 708. Typically, a steep descent gradient is used in which the error is minimized by looking for a gradient. One advantage of this is it helps to avoid local minima where the AI engine may be trained to a certain point but may be in a minimum which is local but it's not the true minimum for that particular engine. The final weights are then determined in 710 after which the model is ready to use.

In terms of provision of the training data, preferably balanced and representative training data is used. The training data is preferably representative of the types of actual data which will be processed by the machine learning model.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A system for determining a relative importance of a selected test in a plurality of tests for testing code, comprising a computational device for receiving one or more characteristics relating to an importance of said code, an importance of each of said plurality of tests, or both; and for determining the relative importance of said selected test according to said characteristics; wherein said computational device comprises a memory for storing instructions and a processor for executing said stored instructions, for determining the relative importance of the selected test; and an analyzer for determining a relationship between a test and the code that is tested according to a statistical analysis, or a combination of said statistical analysis and a machine learning algorithm, wherein said analyzer is executed by said processor according to instructions stored in said memory; wherein said statistical analysis comprises determining a statistical relationship between said test and the code according to test coverage and execution data collected by a plurality of test listeners; wherein said characteristics relate to an importance of said code, wherein said characteristics are selected from the group consisting of use of the code in execution by an end user, interactions between a section of the code and other sections, an importance of the code overall for execution in production, code with many changes or new commits, and otherwise modified code.

2. The system of claim 1, wherein said analyzer further comprises a plurality of machine learning algorithms and an ensemble learning algorithm for determining said relationship.

3. The system of claim 1, wherein the user determines a rule for test importance or running a test.

4. The system of claim 1, wherein said characteristics relate to an importance of said plurality of tests, where in characteristics are selected from the group consisting of tests that apply to code that is deemed important, tests that have failed previously, new and modified tests.

5. The system of claim 4, wherein an importance of a test in relation to said code is determined at least partially according to a change in execution environment, execution environment variables and characteristics, a change in an execution configuration file or a change in an execution asset.

6. The system of claim 5, wherein said execution asset comprises one or more of an image file, CSS file or another file which supports execution of the code but which is not compiled or executed.

7. The system of claim 6, wherein said statistical analysis determines said statistical relationship between said test and the code as determined according to a test execution time frame relative to execution time frame of a particular section of code.

8. The system of claim 7, wherein said statistical relationship is based on dynamic code instrumentation and coverage data collected by the test listeners.

9. The system of claim 8, wherein said test listener further defines a new footprint format, said footprint comprising a context, said context comprising a selection of tests to be applied and headers for communication for the tests.

10. The system of claim 9, wherein said test listener forces a test framework to run a recommended test list and skip other tests not in the list.

11. The system of claim 9, further comprising a test agent for monitoring behavior of executed code under test.

12. The system of claim 8, further comprising a history analyzer for analyzing historical test data and code changes, for transmitting said analysis to said analyzer for performing said statistical analysis and for creating a build history map; wherein said build history map maps each test to at least a portion of the code for each execution.

13. The system of claim 12, further comprising a mapper for determining a relationship between one or more code components and said plurality of tests to be executed.

14. The system of claim 13, wherein said memory is configured for storing a defined native instruction set of codes and said processor is configured to perform a defined set of basic operations in response to receiving a corresponding basic instruction selected from the defined native instruction set of codes stored in said memory, wherein said processor executes said mapper according to said instructions stored in said memory.

15. The system of claim 14, wherein said computational device further comprises a build scanner and a footprint correlator, and wherein said memory stores a first set of machine codes selected from the native instruction set for receiving information from a build scanner about a new build and/or changes in a build; a second set of machine codes selected from the native instruction set for receiving information about test coverage, when certain tests were performed and when different portions of code were being executed when such tests were performed; and a third set of machine codes from the native instruction set for operating a footprint correlator, for determining which tests relate to code that has changed, or that is likely to have changed, as well as for receiving information regarding code coverage.

16. The system of claim 15, wherein said computational device further comprises a history analyzer, and wherein said memory stores a fourth set of machine codes from the native instruction set for communicating such changed code and/or code coverage information to said history analyzer, and a fifth set of machine codes from the native instruction set for assigning likely relevance of tests to the new or changed code, based on historical information.

17. The system of claim 16, wherein said computational device further comprises a statistical analyzer, and wherein said memory stores a sixth set of machine codes from the native instruction set for communicating such changed code and/or code coverage information to said statistical analyzer, and a seventh set of machine codes from the native instruction set for determining statistical relevance of one or more tests to one or more sections of code.

18. The system of claim 17, wherein said seventh set of machine codes determines said statistical relevance of said one or more tests to new or changed code.

19. The system of claim 13, wherein said mapper determines said relationship according to a previous history of execution of said plurality of tests or according to an analysis of a relationship between said plurality of tests and execution of said code.

20. The system of claim 19, wherein said relationship is determined according to a timing of execution of said code.

21. The system of claim 20, wherein said timing of said execution of said further comprises a timing margin, wherein said timing margin comprises an additional amount of time for accepting a test execution as being related to said code execution.

22. The system of claim 19, wherein said relationship is further determined according to a relative degree of sensitivity vs accuracy.

23. The system of claim 12, further comprising a statistical model determined according to said statistical analysis and a build scanner, wherein said analyzer receives said historical analysis, wherein said build mapper creates a build map from an analysis from said build scanner and from said build history map, and wherein said build map is fed to said statistical model to determine a further statistical model map; wherein said analyzer further determines said relationship between said test and the code that is tested according to said further statistical model map.

24. The system of claim 23, wherein said statistical model map further comprises a test to method mapping for determining a test footprint for each test.

25. The system of claim 24, wherein said build mapper further comprises a footprint correlator, for determining which tests relate to code that has changed or is likely to have changed according to said statistical analysis.

26. The system of claim 25, wherein said build mapper further comprises a machine learning analyzer, said machine learning analyzer further comprising a machine learning algorithm, for creating said build map.

27. The system of claim 25, wherein said footprint correlator further communicates information about said tests relating to code that has changed or is likely to have changed, and information about code coverage, to said history analyzer; wherein said history analyzer assigns likely relevance of tests to the new or changed code, based on historical information; wherein said statistical analyzer receives said likely relevance and determines statistical relevance of one or more tests to one or more sections of code.

28. The system of claim 27, further comprising a test impact analyzer for recommending one or more tests to be performed, wherein said statistical model further comprises a correlation coefficient, indicating a numerical correlation between each test and a code element; wherein said test impact analyzer recommends said one or more tests according to said correlation coefficient.

29. The system of claim 28, wherein said test impact analyzer further recommends one or more tests according to one or more rules, wherein said rules are selected from the group consisting of a test covering code that was modified multiple times recently, a test covering code that is marked as high risk code, and a test recommended previously that was not yet performed.

30. The system of claim 29, wherein said rules are further selected from the group consisting of a test relevant to server bootstrapping code, and a test executed after one or more execution configuration or execution environment variables has been changed.

31. The system of claim 23, wherein said analyzer analyzes a failed test to determine whether said failed test has failed previously; if said failed test has not failed previously, said analyzer determines if said code has changed; if said code has not changed, said analyzer determines that said failed test is defective.

* * * * *